July 20, 1965  J. C. MORRISS, JR., ETAL  3,195,205
BAND ATTACHING MEANS FOR PIPE CLAMP HAVING MALLEABLE JAWS
Filed Aug. 14, 1963
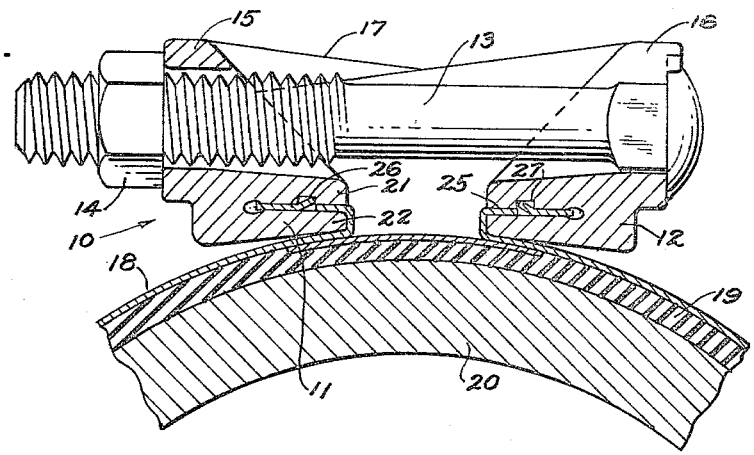
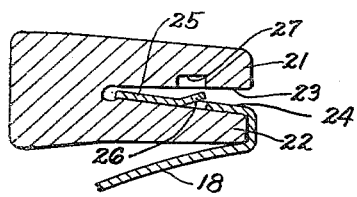
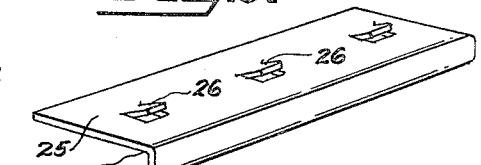
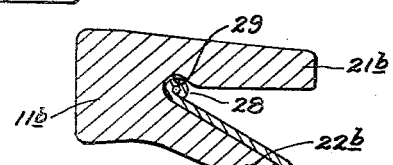
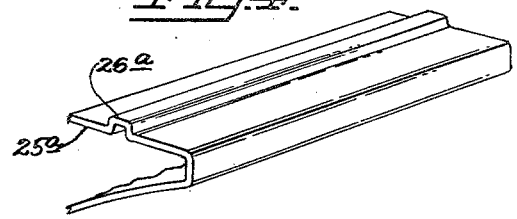
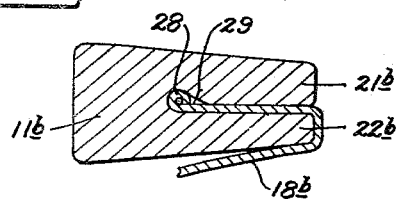
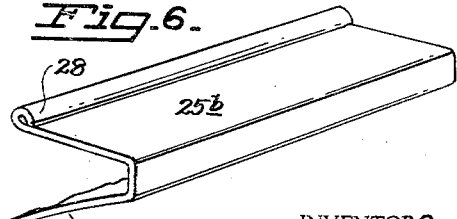
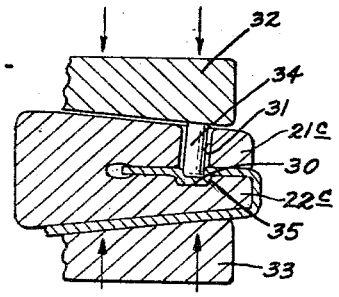
INVENTORS
JAMES C. MORRISS, JR.
ALLISON D. OWEN
BY
ATTORNEY

United States Patent Office 3,195,205
Patented July 20, 1965

3,195,205
BAND ATTACHING MEANS FOR PIPE CLAMP HAVING MALLEABLE JAWS
James C. Morriss, Jr., Belmont, and Allison D. Owen, Belvedere, Calif., assignors to Smith-Blair, Inc., San Francisco, Calif., a corporation of California
Filed Aug. 14, 1963, Ser. No. 302,113
1 Claim. (Cl. 24—279)

This invention relates to pipe repair clamps of the type in which rigid lugs are used to bring together the ends of a malleable band that extends around the pipe. More particularly, the invention relates to an improved structure for securing the ends of the band to the lugs.

Pipe clamps utilizing a malleable band attached to rigid lugs are now widely used because of their versatility and effectiveness in meeting various conditions. In more recently developed clamps the problem of bolt bending due to the tendency of the lugs to tip as the bolts are tightened has been largely overcome, and in these clamps greater amounts of torque can be applied to the bolts to draw the lugs together to tighten the band around the pipe. However, the ability of the lugs to withstand a greater tightening force increased the problem of securing the ends of the malleable band to the lugs. Accordingly, a general object of the present invention is to provide an improved pipe clamp structure for connecting a malleable band to a pair of rigid lugs so that the band cannot possibly slip on the lugs or break loose from them even when an unusually large tightening force is applied to draw the lugs together.

The problem of attaching a rigid pair of lugs to a flexible metal band has since the early development of pipe clamps been essentially one of providing a connecting structure of adequate strength that was also practical to manufacture. In an early form of pipe clamps the attachment of the band to the lugs was accomplished by crimping the band ends into milled slots in the lugs. However, the milling operation was an expensive manufacturing step, and moreover this connection often was not tight enough, the band end tending to slip out of the slot when pressure was applied during the tightening of the bolts. Any slipping of the band away from the lugs made the clamp useless. In other later forms of clamps attempts were made to solve the problem by the use of auxiliary wedges and rods retained by portions of the lugs to hold the band ends in place. In addition to the extra parts required, this latter attachment method also required complicated manufacturing steps, and thus increased the overall cost of the clamps.

In a more recent development in the pipe clamp art, as disclosed in U.S. Patent No. 3,089,212, the lugs are cast from a malleable metal material with jaw portions originally in the open position. The jaw portions are provided with mating projections and recesses which cooperate as the jaws are closed on the band to secure its end portion to the lug.

Another object of the present invention is to provide a pipe clamp utilizing the basic feature of the lugs made of malleable material and originally cast in the open position but having an improved structure adapted to cooperate with the end portion of a malleable band to connect it to the lugs when the lug jaws are closed against end portions of the band.

A further important object of the present invention is to provide an improved means for attaching the ends of a malleable band to a pair of rigid lugs that is particularly well adapted for ease and economy of manufacture.

In accordance with the invention, lugs made from malleable material and originally cast in the spread apart or open position are constructed with recesses that cooperate in a unique manner with projections or bead members on the end portions of the malleable band to form a locking connection as the lug jaws are closed. In contrast to the malleable type of lugs heretofore developed, the present lugs are cast in a relatively simple form without any small projections which would make the casting difficult to manufacture with precision and which are subject to damage or breakage before the clamps are assembled.

Other objects, advantages and features of the invention will become apparent from the following detailed description from the drawings, in which:

FIG. 1 is a view in elevation and in cross section showing a pair of pipe clamp lugs having a band attaching means embodying the principles of the invention;

FIG. 2 is an enlarged fragmentary view in section showing one of the lugs of FIG. 1 with the jaws in the open position;

FIG. 3 is a fragmentary view in perspective showing an end portion of the band for the lugs shown in FIGS. 1 and 2;

FIG. 4 is a fragmentary view in perspective showing the end portion of a modified form of band;

FIG. 5 is a view in cross section showing a somewhat modified form of lug according to the invention with the jaws in the open position;

FIG. 6 is a fragmentary view in perspective showing an end portion of a band adapted to be used in combination with the lug shown in FIG. 5;

FIG. 7 is a fragmentary view in section showing the lug of FIG. 5 in a closed position;

FIG. 8 is a fragmentary view in section showing still another modified form of the invention.

Referring to the drawings, FIG. 1 shows a cross-sectional view of a pipe clamp 10 embodying the principles of the invention. Generally, the clamp comprises a pair of lug members 11 and 12 that are connected by a series of bolts 13 each having a nut 14 threaded to one end and thereby adapted to move the lugs towards each other when the nuts are tightened. The lug members 11 and 12 that are shown are each preferably provided with upwardly extending projections 15 and 16 that are spaced apart along the lugs for supporting the bolts and nuts. The lugs shown also have a number of stabilizing fingers 17, each of which extends across to and bears on the upper surface of the opposite lug to prevent the lugs from tipping as the bolts are tightened.

The lugs 15 and 16, as shown, may have any desired length and thus any number of bolts 13 depending on the size of the pipe break being repaired. More details concerning the placement and spacing of the bolts may be found in the aforesaid U.S. Patent No. 3,089,212. While we have shown a form of lugs having the stabilizing fingers 17 for illustrative purposes, it is to be understood that the present invention is not in any way concerned with such fingers and thus is not limited to lugs having them.

As shown in FIG. 1, the lugs 11 and 12 are each connected to one end of a flexible band or sleeve 18 of a malleable metal material that extends around a gasket 19 covering the leak in the pipe 20 being repaired. The means for attaching this band 18 to the lugs 11 and 12 comprises the principal feature of the invention. The lugs are made from malleable iron or some other suitable metal material which can be bent or coined after casting instead of being brittle like cast iron, for example. Both of the lugs 11 and 12 are identical in all respects relating to the features of the invention and each is formed with upper and lower jaw portions 21 and 22. When the lugs are cast, the jaws are in the open position with their inside surfaces 23 and 24, respectively, spread apart. One of the jaw members on each lug is provided with a recess in its inner surface which is adapted to receive a mating projection extending from the end portion of the band 18. Thus, when the band is connected to a lug, its end portion is placed between the jaws 21 and 22, and they are then closed against the band 18 so that its projections are seated in the jaw recesses and thereby providing a locking connection that prevents any movement of the band between the jaws even when a large force is applied to draw the lugs together.

In the embodiment of FIGS. 1–3, the band 18 is shown having end portions 25 that are bent back in generally a hooked shape. Spaced apart along the band end portion 25 and from the end edge thereof are a series of projections 26 which may be partially cut and punched out tabs as shown, or uncut dimpled members. The projections 26 are adapted to fit within slightly larger recesses 27 in the lugs which are formed during the casting of the lugs and preferably in their upper jaw portion 21. When the clamp 10 is assembled, the end portion 25 of the band 18 is placed between the jaws 21 and 22 with the band projections 26 aligned with the recesses 27. Upon the closing of the jaws tightly against the band by means of a suitable press, the projections 26 fit within the recesses 27 and prevent any movement of the band between the jaws. When upset tabs as shown in FIG. 3 are used, it is preferable that they be formed so that the raised end of the tab bears against the wall of the jaw recess when the band tends to pull outwardly from the jaws. This pull on the band causes the tabs to open up and offer even greater resistance, thereby assuring a strong durable locking action.

The recess 27 shown in FIG. 2 may be one of a series of substantially round depressions which can be spaced apart on the lug jaws 21, or it may be a groove extending the length of the lug jaw. A groove type recess 27 could be used in combination with the spaced apart projections 26 or with a modified band end portion 25a, as shown in FIG. 4, having a longitudinally extending ridge type projection or bead portion 26a which would fit and seat itself within the aforesaid groove type recess of the lug jaw when the jaws are closed together.

In another embodiment of the invention, shown in FIGS. 5–7, the band 18b has a generally hook shaped end portion 25b with an outwardly extending bead portion 28 along its outer edge. The bead 28 can be formed conveniently by merely bending back a portion of the end edge of the band 18b. Here, the lugs designated by the numeral 11b are cast with the usual jaw open configuration and near the inner junction of the jaw members 21b and 22b a groove or recess 29 is cast which extends longitudinally along the length of each lug. The groove 29 preferably extends upwardly into the upper jaw portion 21b so that with the jaws in their spread apart position the band end including the bead portion 28 can be easily inserted between the jaws before they are closed together in a press. When the jaws are closed, the bead 28 is confined tightly within the extended recess 29 and provides for positive locking of the band 18b between the jaws as shown in FIG. 7.

In FIG. 8 another modified form of the invention is shown wherein in the upper and lower jaw portions 21c and 22c of a pair of pipe clamp lugs are originally cast in the open position as previously described and a locking projection is formed on the band end portion 25c between the lug jaws as they are closed by a main die press. The lower jaw portion 22c is provided with a series of recesses 30 spaced apart along its inner surface and the upper jaw 21c is cast with an equal number of through passages 31 which are aligned directly above the recesses 30 when the lug jaws are closed. As the jaws are pressed together between a pair of die members 32 and 33 and against the band end portion 25c between them, punch members 34 attached to and actuated by the upper die member 32 extend downwardly through the passages 31 and upset the band to form locking projections 35 within the recesses 30.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

A pipe clamp comprising: a pair of lugs and a plurality of bolts through said lugs for drawing them together, each of said lugs having a bendable pair of malleable jaws originally cast in the open position with inner jaw surfaces that diverge outwardly from a junction thereof, said junction extending longitudinally along the lugs, both said jaw surfaces being devoid of projections, one of said jaw inner surfaces having a substantially smooth surface free of indentations and the opposite jaw surface having a groove, and a flexible metal band having an end portion adapted to fit between and be retained by said lug jaws, said end portion being substantially flat except for a retaining means extending outwardly therefrom to engage said groove, said retaining means being seated within said jaw groove when the lug jaws are closed on said band end portion.

References Cited by the Examiner

UNITED STATES PATENTS

| 235,273 | 12/80 | Miller | 24—20 |
|---|---|---|---|
| 628,882 | 7/99 | Werner | 24—284 |
| 1,445,568 | 2/23 | Terheide | 24—276 |
| 1,907,889 | 5/33 | Stauffer | 24—280 X |
| 2,359,418 | 10/44 | Hartman | 24—281 X |
| 2,495,667 | 1/50 | Vizner | 24—21 X |
| 2,998,629 | 9/61 | Smith | 24—279 |
| 3,088,185 | 5/63 | Smith | 24—279 |
| 3,089,212 | 5/63 | Graham et al. | 24—279 |

FOREIGN PATENTS

| 129,832 | 4/02 | Germany. |
|---|---|---|
| 259,905 | 7/49 | Switzerland. |

DONLEY J. STOCKING, *Primary Examiner.*